Nov. 18, 1969    M. MODELL    3,478,574
THERMAL CONDUCTIVITY DETECTOR
Filed May 24, 1965
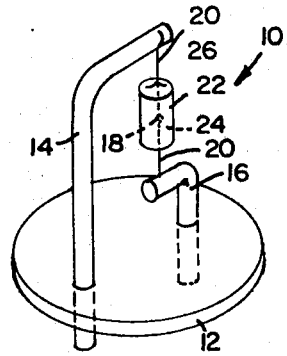
FIG.1
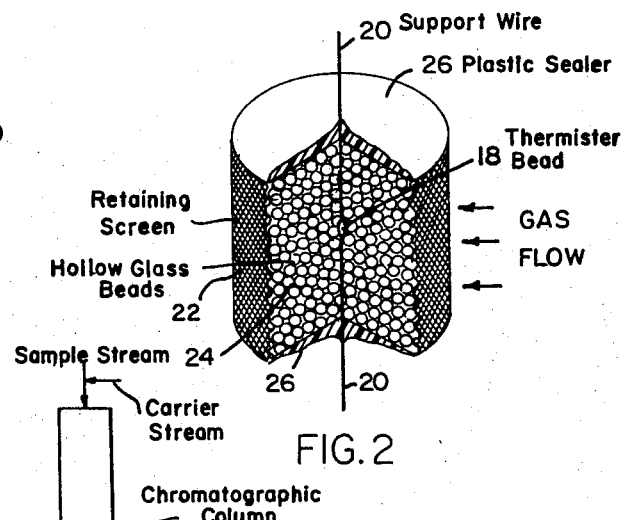
FIG.2
FIG.3
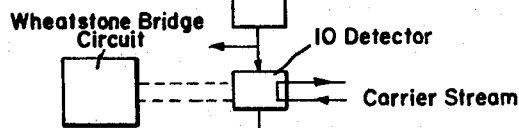
FIG. 5
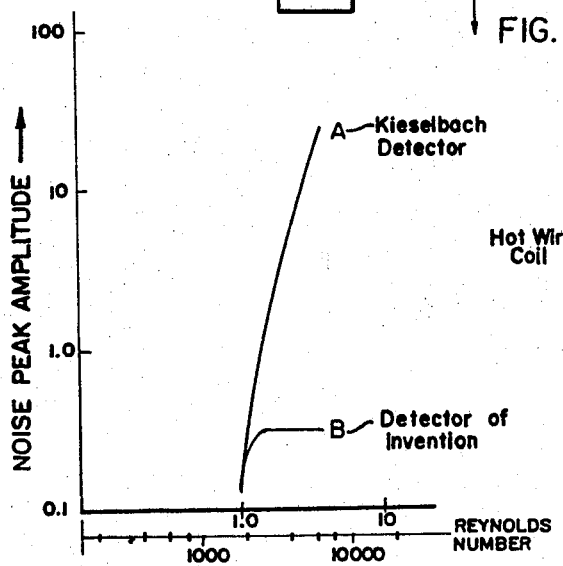
FIG. 4
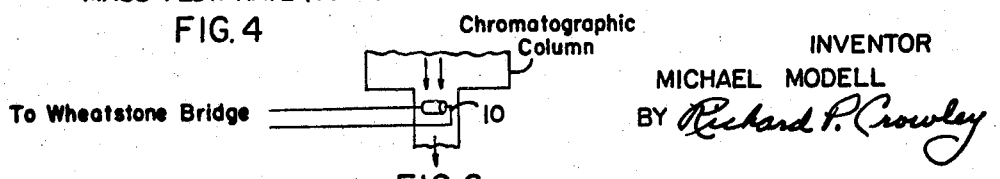
FIG. 6
INVENTOR
MICHAEL MODELL
BY Richard P. Crowley
ATTORNEY United States Patent Office 3,478,574
Patented Nov. 18, 1969

3,478,574
THERMAL CONDUCTIVITY DETECTOR
Michael Modell, Bound Brook, N.J., assignor, by mesne assignments, to Abcor Inc., Cambridge, Mass., a corporation of Massachusetts
Filed May 24, 1965, Ser. No. 458,022
Int. Cl. G01n *31/08*
U.S. Cl. 73—27                                17 Claims

ABSTRACT OF THE DISCLOSURE

A thermal conductivity detector wherein a sensing element such as a thermistor is centrally disposed in a cylindrical bed composed of a plurality of low density non-heat conductive beads such as hollow glass beads, the interstitial void spaces between the beads permitting diffusion of the gas stream to the sensing element. The detector is characterized by a low noise to signal ratio and the sensing element detects the variations in a gas stream independent of flow variations of the gas stream above a Reynolds number of about 2000.

---

My invention relates to improved thermal conductivity detectors, and in particular to an improved packed bed thermistor or hot wire device for use in gas chromotography systems.

Thermistors and hot wires have found wide-spread use as sensing elements in thermal conductivity cells. This type of sensing element is placed in a flowing gas stream or a bypass stream or in recessed volume adjacent to either of these flowing fluid streams. The element is usually heated electrically, and is simultaneously used as one resistance arm of a Wheatstone bridge or in some other means wherein changes in an electrical property such as resistance with changes in the temperature of the element can be measured. Since the electrical resistance of these elements are temperature dependent, temperature changes of the sensing element are observed from the corresponding changes in the balance of the Wheatstone bridge or other balanced resistance circuit means.

The temperature of the sensing element is dependent upon the rate of heat transfer from the sensing element to the flowing gas stream; consequently, any changes in gas thermal conductivity which, for example, may result from concentration changes, will result in changes in the sensing element temperature and thereby offset the balance of the Wheatstone Bridge.

One of the major difficulties with present thermal conductivity cells which incorporate these sensing elements, is that the rate of heat transfer from the element is not only a function of the gas thermal conductivity, but also is a function of convective currents and the degree of turbulence in the gas stream. The latter effects are due to the fact that the rate of convective heat transfer is appreciable relative to the rate of molecular conduction. (Rate of molecular conduction is directly related to gas thermal conductivity.) Any change in flow rate will result in a change in the electrical signal output from the balanced circuit in which the element is placed. Furthermore, flow turbulence in the area of the sensing element will result in random noise (which effect is the basis for hot-wire anemometry) and a high noise to signal ratio.

In one attempt to reduce the noise of the sensing element, Kieselbach in U.S. Patent 3,106,088 and in the publication "Reduction of Noise in Thermal Conductivity Detectors for Gas Chromatography," Richard Kieselbach, Anal. Chem. 32, #13, 1749–1754 (December 1960), herein incorporated by reference, devised a screened or shielded thermistor. The disadvantage of this advice is that it is still sensitive to turbulent gas flow rate, although somewhat less sensitive than a bare thermistor. Also, it is extremely difficult to fabricate on a production basis. This device also creates internal natural convective currents which reduces its usefulness.

It is an object of my invention to provide an improved thermal conductivity detector which avoids or minimizes many of the difficulties associated with the prior art detectors.

Another object of my invention is to provide a packed bed thermal conductivity detector characterized by good mechanical shock resistance, a low noise to signal ratio and in which the output signal is relatively independent of gas flow variations in the gas stream in which the detector is employed.

A further object of my invention is to provide a packed bed thermistor or hot wire detector which is of simpler design and easier to fabricate than the Kieselbach shielded resistor.

Other objects and advantages of my invention will be apparent to those persons skilled in the art from the following more detailed description and drawing wherein:

FIGURE 1 is a perspective view of my packed bed detector.

FIGURE 2 is an enlarged partially sectional perspective view of a packed bed thermistor detector.

FIGURE 3 is an enlarged partially sectional perspective view of a packed bed hot wire detector, and, FIGURE 4 is a graphical representation of noise peak amplitude versus mass flow rate in standard cubic feet per minute (s.c.f.m.) or Reynolds number obtained in comparing the packed bed thermistor of FIGURE 2 with a Kieselbach shielded resistor.

FIGURE 5 is a schematic representation of my packed bed detector employed in a chromatographic apparatus with a Wheatstone bridge as a balancing circuit to measure changes in the reactions of the sensing element.

FIG. 6 is an enlarged fragmentary schematic view of the the outlet of a chromatographic column illustrating the positioning of my detector in the primary flow path of the chromatographic streams.

In general, my invention comprises placing a sensing element exhibiting measurable change in an electrical property such as resistance with temperature such as a thermistor, hot wire or the like within a gas-permeable bed packed with low density, non-heat conductive particles or beads. The term non-heat conductive beads refers to beads having an effective thermal conductivity which is small compared to that of the gas being monitored. In a particularly preferred embodiment, my detector comprises a sensing element placed within a cylindrical packed bed of hollow beads such as of glass, resin, plastic or other material. The particle size of the beads and the depth of the bed are selected to obtain a desired response time of the element, and to permit the response of the sensing element to be independent of flow or turbulence in the stream. The beads or particles may be retained within the packed bed and/or held in place by chemical means such as adhesives, physical means such as by heat sintering of the contacting grain boundaries of the beads, or by mechanical means such as by a surrounding constricting device such as finely divided gas permeable sheet, or screen material. A typical constricting device has a large precentage open area such as a wire-mesh or electro formed screen, for example.

In my packed bed, the sensing element can transfer heat to the flowing gas by either of two means: (1) by thermal conduction through gas in the void space external to the hollow beads, or (2) by thermal conduction through the beads. Since each spherical bead is non-heat conductive, and has only a small area of contact with other beads, mechanism (2) is an extremely slow method of heat transfer. Therefore, practically all of the heat transfer will occur via route (1) which is directly related to the thermal conductivity of the gas, and which is relatively independent of flow variations of the gas sample stream.

For example in gas streams due to molecular diffusion, any changes in concentrations or the nature of the gas in the gas stream will result in corresponding changes of concentration or gas in the packed bed within the interstitial void volume external to the beads. Thus, changes in the gas stream will result in unbalance of the Wheatstone bridge or other circuit in which the sensing element is electrically connected. Of course, there is a delay or response time associated with the molecular diffusion into the bed. This time can be made insignificant, i.e. less than 1 to 15 seconds by a proper choice of bead diameter together with the thickness of the packed bed, i.e. the distance from sensing element to flowing gas stream.

The particular character or nature of the beads to be employed within the packed bed is important in determining optimum conditions and advantages to be derived from my invention. Metal or other heat conductive beads, particularly those which have high mass and a high heat capacity are not normally suitable, since these beads permit the bed to act as a heat sink and considerably decreases the sensitivity of the detector to changes in the gas stream. Low heat capacity and low density beads in either hollow or solid form may be used, but hollow glass and resin beads have proven exceptionally efficient as bed packing material, due to their very low heat capacity, low density and non-heat conductive properties. Solid glass beads may be used, but these would tend to have a high mass, and therefore to decrease the sensitivity to an undesirable level. For example, solid glass beads rather than corresponding hollow glass beads would decrease the sensitivity by an order of magnitude. Solid, cellular or hollow finely divided resin and plastic beads or particles such as hollow phenolic resin beads, such as "Microballoons" manufactured by the Union Carbide Corporation may be employed as bed packing material. The term hollow beads, includes those spherical-like particles which have an interior cellular structure such as gas-expandable polystyrene beads as well as sponge rubber and cellular vinyl resin particles and the like. Low density non-heat conductive inert filler materials such as beads of vinyl chloride resins, polyethylene and polypropylene beads, nylon, Teflon and other low density plastic beads may be employed as the packing materials. The particle size and shape of the beads to be employed should be such as to permit the gas to diffuse into the interior of the bed in the desired response time, and be sufficient to shield the sensing element from direct flow variations in the turbulent gas sample stream. Thus, generally spherical particles as shown in FIGS. 2 and 3 are preferred, since they may be packed in a more regular pattern with uniform interstitial void spaces.

FIGURES 1, 2, and 3 show typical specific embodiments of packed bed detectors of my invention indicated generally as 10, comprising a base of 12, top and bottom electrically conductive support posts, 14 and 16, and a thermistor bead 18 (FIGURE 2) of the vitreous bead type such as a bead of the Fenwal Electronics, Inc. number GB38L1 or a coiled hot wire element such as an electrically heated tungsten wire.

The thermistor 18 or hot wire 19 is mounted by fine diameter platinum wire, 20, attached to the support posts, which support posts extend through electrically non-conductive base 12, to provide terminal posts for connection of the element 18 into a Wheatstone bridge circuit. The thermistor 18 or hot wire 19 is typically approximately centrally placed within an elongated cylindrical packed bed with the bed and the elements preferably disposed generally transverse to the direction of gas flow. The packed bed contains a plurality of hollow glass beads 24 for example of the borosilicate glass type having an average particle size range of about 30 to 125 microns, a wall thickness of about 2 microns, and a bulk density of about 11 pounds per cubic foot. Hollow glass beads of this general type are identifiend as "Eccospheres SI" manufactured by the Emerson & Cummings Company of Canton, Mass. These low density non-heat conductive beads 24 are retained within the packed bed by a surrounding cylindrical finely divided metal screen 22 of electroformed (about 325–423 mesh and having about 60% open area). The top and bottom of the packed cylindrical packed bed is enclosed and sealed with a drop of an electrical insulating epoxy resin or plastic material 26 sealed to the outer edge of the screen 22.

My packed bed thermistor described employing a 0.014 inch diameter thermistor bead (18), enclosed in a cylindrical packed bed of Eccospheres SI with bed dimensions of a 0.25 inch in length and 0.15 inch in diameter has proven considerably superior to the shielded Kieselbach resistors of FIGURE 3A. My packed bed thermistor on being disposed directly in an inert carrier gas stream such as helium or nitrogen has proven to have an exceptionally low noise to signal ratio, and to be independent of the flow conditions in the gas stream when high turbulence is present. Also the use of my packed bed design imparts excellent mechanical stability and shock resistance to the sensing element. Additionally my detectors are easy to fabricate, since they do not require the spacing of the shield a minute and precise distance from the small thermistor bead. Furthermore, my detector may be employed directly in both laminar and turbulent flow gas streams.

FIGURE 4 shows typical graphical results of test data obtained in comparing the noise level of a Kieselbach shielded (FIG. 3a) with my packed bed thermistor as described particularly in FIGURES 1 and 2. The abscissa also correlates the mass flow rate with the Reynolds number of the gas stream, where the gas is helium at an ambient temperature of 70–80° F., and wherein the diameter of the cylindrical straight flow through hole in the detector block in which test detectors were placed and used to characterize the Reynolds number had a one inch internal diameter. In FIG. 4 "A" designates the results obtained with the Kieselbach shielded resistor, and "B" designates the results obtained with my detector of FIGURE 2. The noise sensitivity of the Kieselbach resistor increased with increasing Reynolds number. The noise sensitivity with my detector gave a curve flattening out and reaching a constant value at high flow rates and turbulent flow conditions, that is a Reynolds number of about 2,000 or greater. Noise level was not detectible for either design at less than 1.1 s.c.f.m. (Reynolds number 1800). At about two standard cubic feet per minute, a Reynolds number of approximately 3200, my detector has a noise to signal ratio about $1/100$ of that of the corresponding Kieselbach resistor.

Noise is caused by random fluctuation of the rate of heat transfer about a mean value. In laminar flow, there are little or no fluctuations in the heat transfer coefficients, internal or external, thus no noise is detected in either design. In my design, gas flow turbulence is unable to penetrate the packing, so any variation in the heat transfer is due solely to the external heat transfer coefficient. Further, since the external coefficient is much higher than the internal, the resultant variation in the overall coefficient is very small and thus, the noise level is low. For the Kieselbach design the turbulence penetration causes random variations in the internal coefficient while the external coefficient also decreases. Thus, the net effect of the gas flow turbulence with this design is to increase the noise in the internal coefficients (which is the predominating one).

My packed bed design effectively shields the sensing element from the turbulence of the stream, and protects the sensing element from mechanical shock. The relative response time of my detector was about 2–3 seconds. The data was obtained using the equivalent of helium slugs in a nitrogen carrier gas stream with the sensing element as one arm of a Wheatstone bridge circuit. The noise was reported as the maximum noise amplitude (mean to peak level). My detectors are of particular use in both analytical as well as large diameter preparative chromatographic columns of two to four inches in diameter or more wherein turbulent flow prevails, and wherein the Kieselbach shielded resistor and other prior art detectors would be wholly unsuitable or have an undesirable high noise to signal ratio. My packed bed detector may also be used to measure the basic thermal conductivity of a gas sample, apart and independent from variations in the sample flow.

What I claim is:

1. A method of detecting the change in thermal conductively of a gas stream which comprises:
    (a) placing in a gas stream of turbulent flow the thermal conductivity of which is to be detected a sensing element which is packed in a bed of low heat capacity generally uniform low density substantially non-heat conductive beads;
    (b) diffusing a portion of the turbulent gas stream through the beads and in contact with the sensing element; and
    (c) detecting the changes in thermal conductivity of the gas stream with the sensing element independent of the flow variations of said stream.

2. The method of claim 1 wherein the thickness of the surrounding beads is varied to obtain a predetermined response time.

3. The method of claim 1 wherein the Reynolds number of the gas flow stream is greater than about 2100.

4. The method of claim 1 wherein the beads are hollow glass beads.

5. A method of detecting the changes in thermal conductivity of one or more components of a fluid stream which method comprises:
    disposing directly in the primary flow path of a fluid stream containing one or more components whose thermal conductivity is to be detected, a detector which comprises a sensing element which varies in electrical resistance as a function of temperature disposed within a packed bed containing generally uniform plastic or hollow glass beads, the sensing element generally centrally disposed in the packed bed, the bed characterized by interstitial void spaces between the beads and the sensing element operatively connected to an electrical measuring circuit so that the gas stream diffuses through the interstitial void spaces of the beads into contact with sensing element; and
    detecting the changes in electrical resistance of the sensing element due to changes in the gas stream whereby changes in the nature or concentration of one or more of the components of the gas stream through thermal conductivity can be determined.

6. The method of claim 5 wherein the Reynolds number of the gas stream in which the detector is disposed is greater than about 2000.

7. The method of claim 5 which includes:
    placing the detector directly in the primary gas flow path of a gas stream withdrawn from a chromatographic column whereby one or more of the gas chromatographic fractions in the gas stream are detected by their thermal conductivity.

8. A thermal conductivity detector which comprises in combination:
    a base, a sensing element which varies in resistance as a function of temperature, supporting means on the base, a packed bed containing a plurality of hollow glass beads having an average diameter of from about 30 to 125 microns, the beads confined within a generally cylindrical finely divided mesh screen, means to seal each end of the cylindrical bed to the screen, and means to mount the sensing element in the packed bed on the supporting means with the sensing element disposed in a generally central location within the packed bed and adapted to be disposed transverse to the flow of the fluid sample to be detected.

9. In a thermal conductivity detector:
    a sensing element which varies in a measurable electrical property as a function of temperature; and
    a packed bed containing low heat capacity, generally uniform low density, substantially non-heat conductive plastic beads, the bed characterized by generally uniform interstitial said spaces between the beads; the sensing element disposed within the bed the thickness of the bed and the interstitial spaces between the beads selected to permit diffusion of a fluid stream containing one or more components to be detected by the sensing element, whereby above a Reynolds number of about 2000 the noise sensitivity of the sensing element is independent of flow variations of the fluid stream.

10. In a thermal conductivity detector:
    a sensing element which varies in a measurable electrical property as a function of temperature; and
    a packed bed containing low heat capacity, generally uniform low density, substantially non-heat conductive hollow beads, the bed characterized by generally uniform interstitial void spaces between the beds;
    the sensing element disposed within the bed, the thickness of the bed and the interstitial void spaces between the beads selected to permit diffusion of a fluid stream containing one or more components to be detected by the sensing element whereby above a Reynolds number of about 2000 the noise sensitivity of the sensing element is independent of flow variations of the fluid stream.

11. The detector of claim 14 wherein the sensing element is a thermistor approximately centrally disposed in the packed bed.

12. The detector of claim 14 wherein the sensing element is a hot wire.

13. The detector of claim 10 wherein the beads are hollow glass beads.

14. The detector of claim 10 wherein the packed bed is contained and enclosed within a cylindrical, finely meshed gaspermeable screen.

15. The detector of claim 10 wherein the beads are resin beads.

16. The detector of claim 10 wherein the beads are hollow glass beads having an average particle size of from about 30 to 125 microns.

17. The detector of claim 10 wherein the sensing element varies in electrical resistance with temperature, and which includes an electrical balancing circuit electrically connected to the sensing element to measure the change in resistance with temperature of the element.

References Cited

UNITED STATES PATENTS

| | | | |
|---|---|---|---|
| 3,334,514 | 8/1967 | Catravas | 73—23.1 |
| 3,368,385 | 2/1968 | Harvey | 73—23.1 |
| 989,929 | 4/1911 | Schroder et al. | |
| 1,818,619 | 8/1931 | Harrison | 73—27 |
| 2,254,480 | 9/1941 | Guaragna. | |
| 2,400.923 | 5/1946 | Farr et al. | |
| 2,833,629 | 5/1958 | Carbonara et al. | 73—27 X |
| 2,934,041 | 5/1960 | Snitzer et al. | |
| 3,237,181 | 2/1966 | Palmer | 73—27 X |

OTHER REFERENCES

An article entitled "Reduction of Noise in Thermal Conductivity Detectors for Gas Chromatography," in Analytical Chemistry, vol. 32, No. 13, December 1960, pp. 1749–54.

RICHARD C. QUEISSER, Primary Examiner

JOHN K. LUNSFORD, Assistant Examiner